US006983944B2

(12) United States Patent  (10) Patent No.: US 6,983,944 B2
Bergia  (45) Date of Patent: Jan. 10, 2006

(54) SUPERMARKET TROLLEY

(75) Inventor: Michelangelo Bergia, Cavallermaggiore (IT)

(73) Assignee: Plastimark S.p.A., Racconigi (IT)

( * ) Notice: Subject to any disclaimer, the term of this patent is extended or adjusted under 35 U.S.C. 154(b) by 147 days.

(21) Appl. No.: 10/602,892

(22) Filed: Jun. 25, 2003

(65) Prior Publication Data
US 2004/0104549 A1 Jun. 3, 2004

(30) Foreign Application Priority Data
Jun. 26, 2002 (IT) .......................... TO2002A0554

(51) Int. Cl.
*B62D 39/00* (2006.01)
(52) U.S. Cl. .............................. 280/33.991; 280/33.992
(58) Field of Classification Search ........... 280/33.991, 280/33.992, 33.993, 33.995, 33.996, 33.997, 280/47.34, 79.11
See application file for complete search history.

(56) References Cited

U.S. PATENT DOCUMENTS

| 4,268,049 | A | * | 5/1981 | Salvador | 280/33.996 |
| 4,746,134 | A | * | 5/1988 | Rehrig | 280/33.991 |
| 5,289,936 | A | * | 3/1994 | Jones et al. | 220/4.28 |
| 5,368,318 | A | * | 11/1994 | Rehrig et al. | 280/33.993 |
| 5,613,696 | A | * | 3/1997 | de Luna | 280/33.992 |
| 5,769,435 | A | * | 6/1998 | Nishida | 280/33.991 |
| 5,791,666 | A | * | 8/1998 | Mainard | 280/33.991 |
| 5,915,704 | A | * | 6/1999 | Segura de Luna | 280/33.991 |
| 6,144,580 | A | * | 11/2000 | Murray | 365/185.01 |
| 6,540,240 | B2 | * | 4/2003 | Nadeau et al. | 280/33.993 |
| 6,705,623 | B2 | * | 3/2004 | Nadeau et al. | 280/33.991 |
| 6,761,364 | B2 | * | 7/2004 | Murar et al. | 280/33.991 |
| 2002/0135144 | A1 | * | 9/2002 | Murar et al. | |

FOREIGN PATENT DOCUMENTS

| CA | 2 314 774 A1 | | 1/2002 |
| EP | 161890 A2 | * | 11/1985 |
| EP | 222480 A1 | * | 5/1987 |
| GB | 2 177 354 A | | 1/1987 |
| WO | WO 93/11018 | * | 6/1993 |
| WO | WO 97/30880 A1 | | 8/1997 |

* cited by examiner

*Primary Examiner*—Christopher P. Ellis
*Assistant Examiner*—Christopher Bottorff
(74) *Attorney, Agent, or Firm*—Sughrue Mion, PLLC

(57) ABSTRACT

A supermarket trolley comprising a base with wheels and a basket both made of a moulded plastic material. The basket is connected posteriorly to a pair of uprights of the base by means of respective substantially comb like formations mutually complementary and meshing with each other, whereto are associated mutually engaged tongue and groove elements.

21 Claims, 3 Drawing Sheets

SUPERMARKET TROLLEY

FIELD OF THE INVENTION

The present invention generally relates to supermarket trolleys or carts.

More in particular the invention relates to such a trolley of the kind comprising a base made of moulded plastic material with wheels and a support formed integral with the base and including two lateral uprights connected superiorly by a cross bar, and a basket container also made of moulded plastic material connected at an end to said lateral uprights of the base.

Supermarket trolleys of this kind are described and illustrated, for example, in international patent application WO-97/30880 and in European patent application EP-A-0916563 in the name of Comital Srl.

SUMMARY OF THE INVENTION

The present invention aims at obtaining an improvement over such known trolleys, in particular regarding the economy in the manufacture of its parts and the assembly thereof.

A particular aim of the invention is to reduce the mass of the trolley, and consequently the material required for its production, eliminating parts which are accessory or redundant for purposes of the stability and structural strength of the trolley.

An additional particular aim of the invention is to obtain a carriage of the type define above in which the union between the support of the base and the basket is achievable without using auxiliary retaining organs, and in simple, easily automated ways.

Another particular aim of the invention is to obtain a trolley of the type defined above provided with an essential structure, hence easily manoeuvred by users and by the personnel of the supermarket within which it is employed.

According to the invention, these and other aims are achieved thanks to the fact that the two lateral uprights and the aforesaid end of the basket have respective mutually facing surfaces formed substantially with comb like formations, mutually complementary and mutually meshing by effect of a relative coupling between said basket and said support when the trolley is assembled.

The comb like formations advantageously comprise a plurality of elongated projections, generally in said direction of coupling and possibly slightly angled relative thereto.

According to another advantageous aspect of the invention, the two lateral uprights and the end of the basket are also advantageously formed with groove and tongue elements able to engage each other as a result of the meshing between said comb like formations.

BRIEF DESCRIPTION OF THE DRAWINGS

Further features and advantages of the invention shall become more readily apparent from the description that follows with reference to the accompanying drawings, provided purely by way of non limiting example, in which.

DETAILED DESCRIPTION OF THE INVENTION

Figure 1:
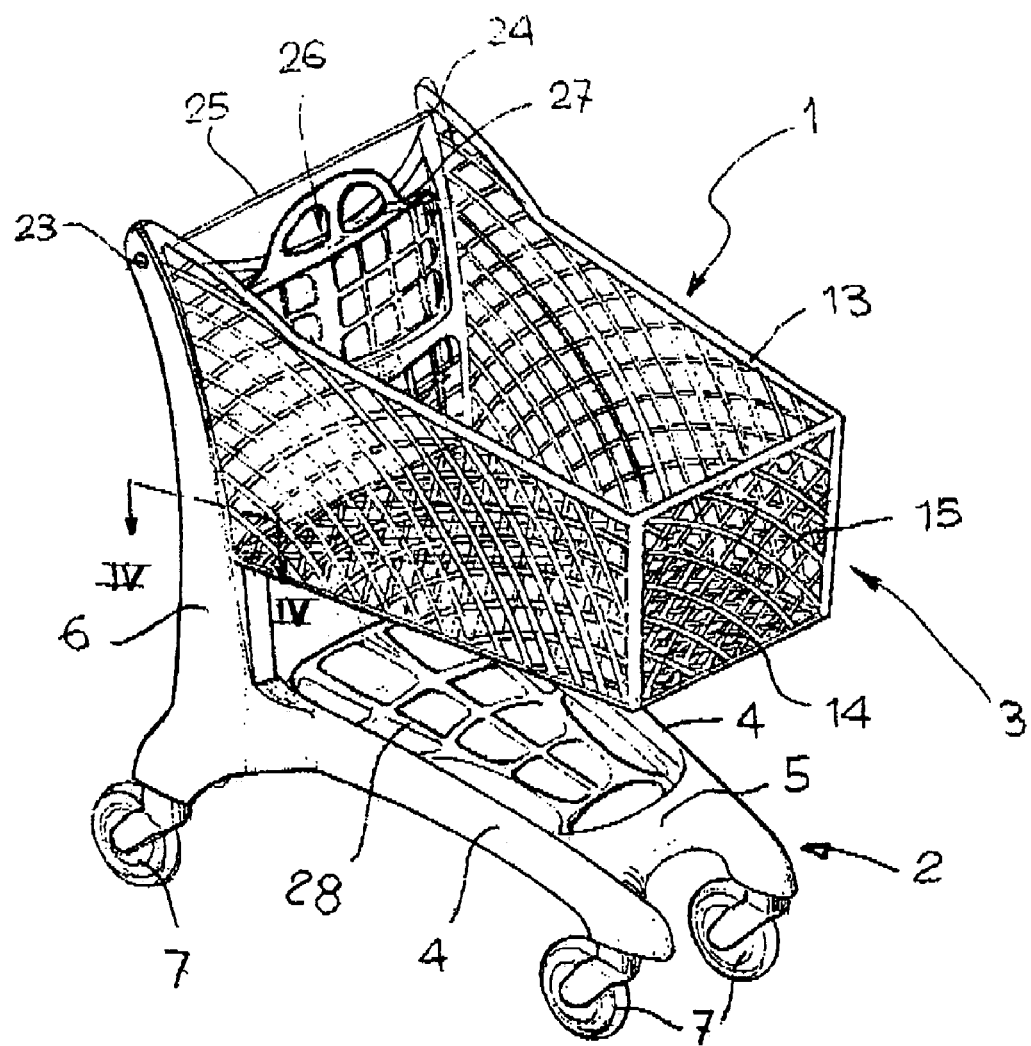
FIG. 1 is a schematic perspective view of a supermarket trolley according to the invention.

With reference to the drawings, the number 1 globally designates a supermarket trolley according to the invention essentially comprising a base 2 and a basket container 3.

The base 2 is constituted by a single piece of moulded plastic material defining a structure substantially shaped as a double "L", with two horizontal branches 4 anteriorly connected to each other by a short transverse member 5 and posteriorly joined to two substantially vertical uprights 6 mutually distanced and separated, extending upwards with a slight curvature.

Wheels at least partly capable of swivelling 7 are positioned respectively underneath the external ends of the horizontal elements 4 and underneath the lower ends of the uprights 6.

The number 28 indicates a shelf fitted between the two horizontal elements 4, behind the transverse member 5.

Figure 3:
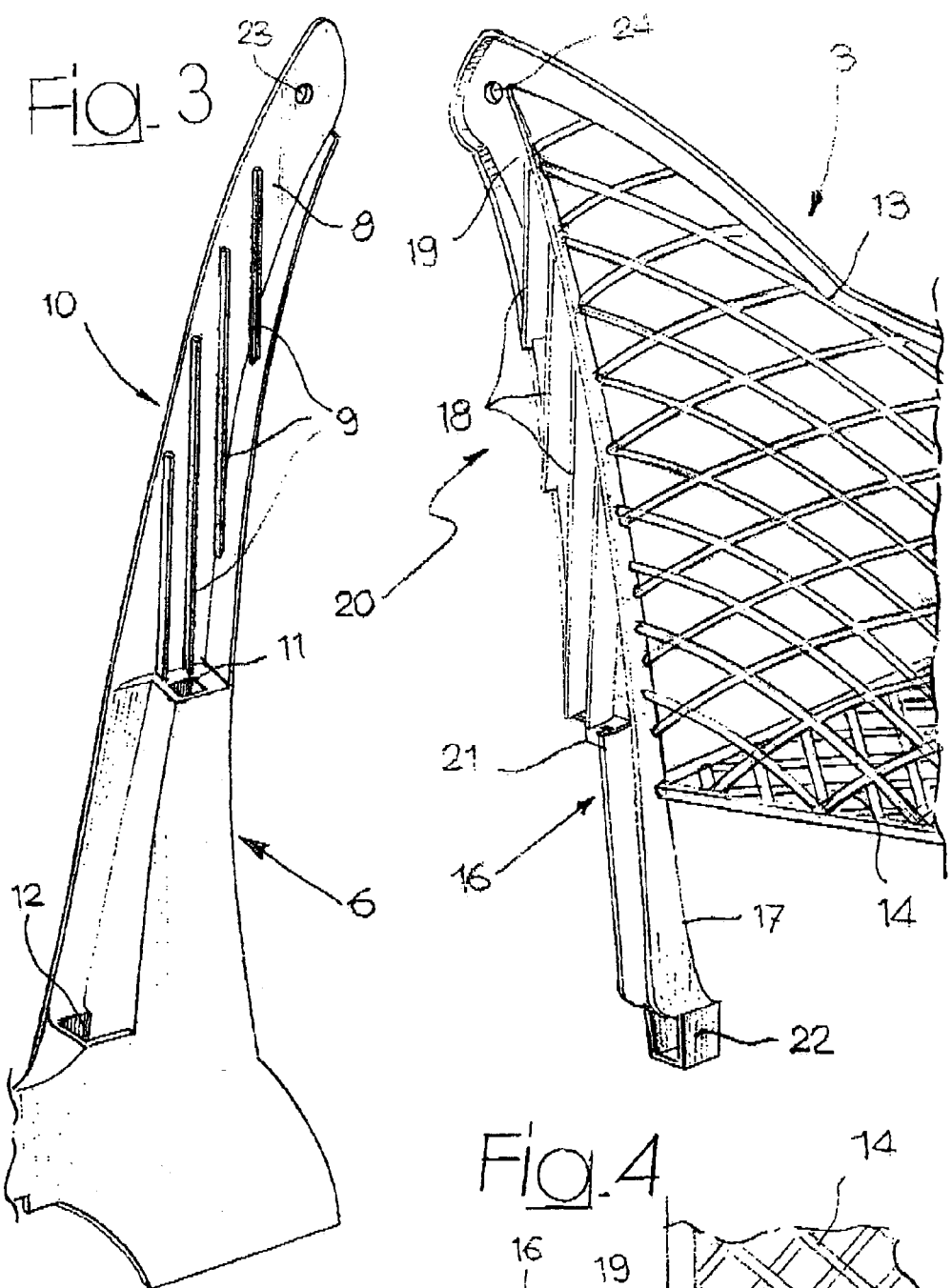
FIG. 3 illustrates, partially and in enlarged scale, two details of FIG. 2.
Figure 4:
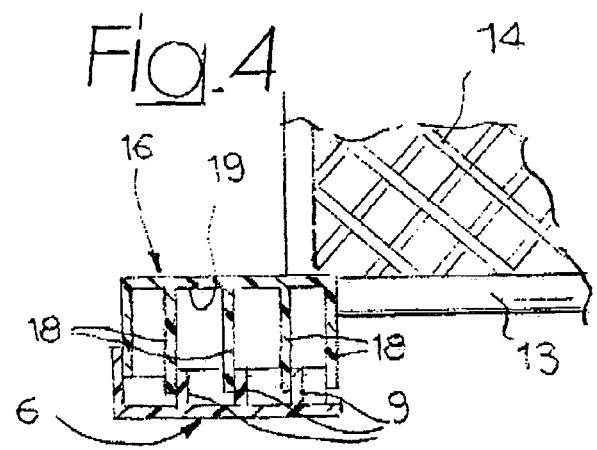
FIG. 4 is a horizontal section view in enlarged scale, according to line IV—IV, of FIG. 1.

As illustrated in greater detail in FIGS. 3 and 4, the inner surface 8 of each upright 6 facing the other upright 6 is formed, approximately in its upper end, with a series of integral elongated projections 9, mutually parallel or more advantageously slightly diverging from each other or also tapered, directed substantially vertically or forming a small angle relative to the vertical. Said projections 9 define, for each upright 6, a respective comb like formation 10.

Below the comb like formation 10 the inner surface 8 of each upright 6 is formed with two seats, respectively upper seat 11 and lower seat 12 having for instance broadly quadrangular section, whereof the upper seat 11 is slighting more rearwards and has smaller dimensions than the lower seat 12.

The basket container 3 is also formed by a single piece of moulded plastic material with lateral walls 13, bottom wall 14 and front wall 15 with grid configuration.

Figure 2:
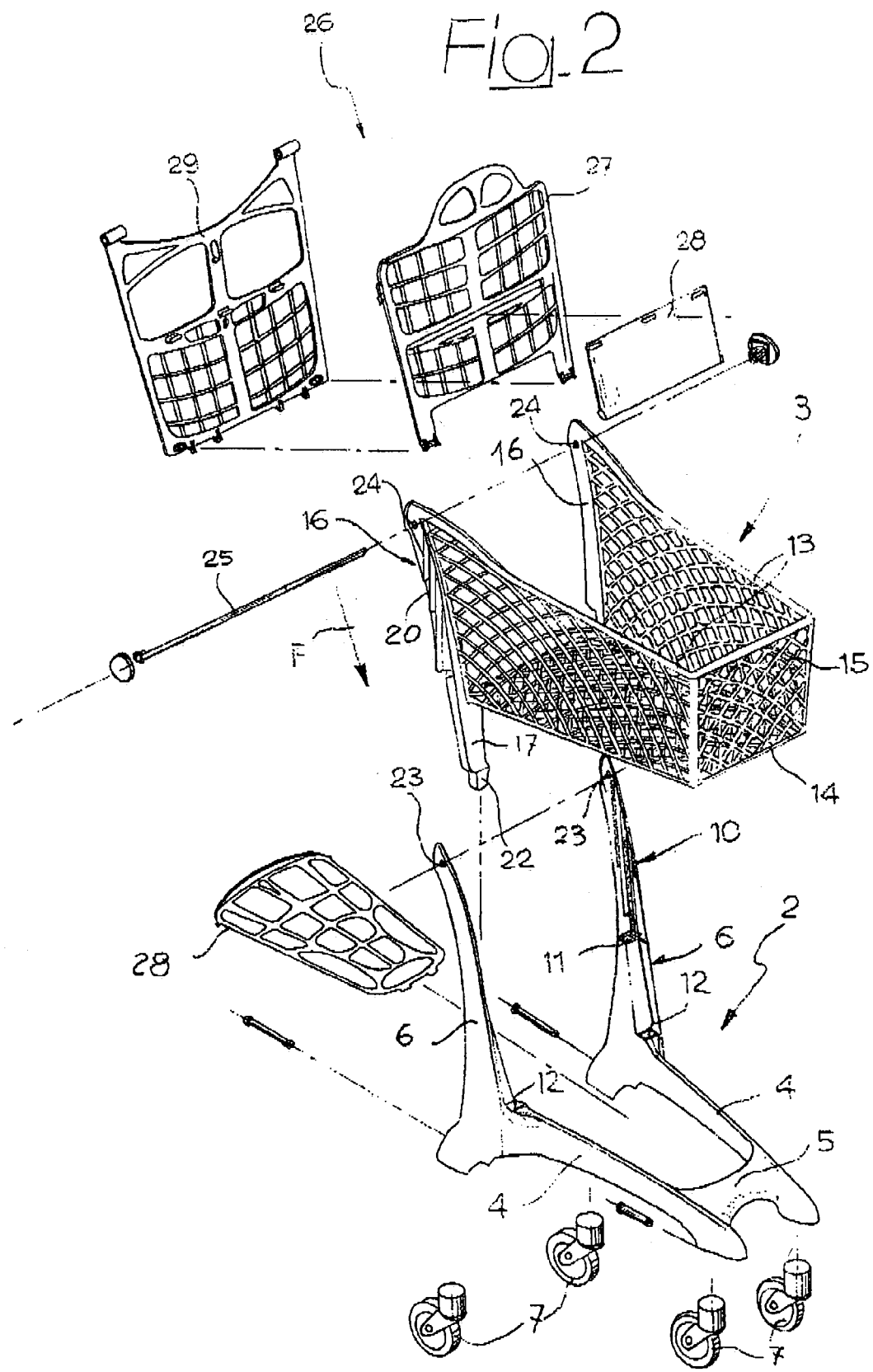
FIG. 2 is an exploded view of FIG. 1.

As FIG. 2 shows, the basket 2 is open posteriorly and is formed with two elongated elements 16 which extend inferiorly underneath its bottom wall 14 with respective legs 17. Each element 16 is formed in correspondence with its exterior surface 19 with a plurality of elongated integral projections 18 substantially identical to the projections 9 of the uprights 6 and positioned in complementary fashion thereto. Said projections 18 constitute respective comb like formations 20 able to co-operate, in a manner explained below, with the comb like formations of the base 2.

Moreover, each elongated element 16 is formed with a pair of projections, respectively upper projection 21, located immediately below the related comb like formation, and lower projection 22, positioned at the lower end of the related leg 17. The projections 21 and 22 have shapes corresponding to those of the seats 11 and 12 of the uprights 10, and are arranged complementarily thereto. Said projections 21 and 22 are formed integral by moulding with the elongated elements 16.

The reference numbers 23, 24 designated through holes provided in proximity to the upper ends of the uprights 6 and of the elongated elements 16, and whose function is to allow the passage of a transverse bar 25, in the manner explained below.

The number 26 globally indicates a child seat assembly constituted by a backrest part 27, by a seat part 28 and by a wall 29 which posteriorly closes the basket 3, between the two uprights 6.

The function of the comb-like formations 10, 20 and of the groove and tongue organs constituted respectively by the seats 11, 12 and by the projections 21, 22 is to obtain, when the trolley 1 is assembled, a stable union between the basket 3 and the base 2 in such a way as to complete their respective load-bearing structures as a result of their mutual union.

Said union is accomplished by effect of a relative coupling motion between the basket 3 and the base 2 along a direction of coupling (indicated by the arrow F in FIG. 2), substantially parallel to the uprights 6, in such a way as to obtain the coupling between them and the elongated elements 16 of the basket 3. Said coupling occurs by effect of the mutual meshing between the comb like formations 10 and 20, whose projections 9 and 18 slide on each other, positioning themselves in the manner shown in FIG. 4, and of the subsequent insertion of the projections 21 and 22 into the seats 11 and 12. At the end of this operation, the basket 3 is stably and firmly fastened relative to the base 2, projecting in overhang from the uprights 6 above the shelf 28 with no need to use auxiliary locking elements.

The assembly is completed by effect of the introduction of the transverse bar 25 through the holes 23 and 24, and of its axial locking in tie rod like fashion in a manner not described in detail, but readily apparent to those versed in the art. The bar 25, whereto the rear wall 29 of the seat assembly 26 is suspended, prevents disengagement between the basket 3 and the base 2 and will normally constitute the support for a tubular handle (not shown herein) for manoeuvring the trolley 3, as well as for a possible token-operated lock for connection to identical trolleys 3 in an aligned, mutually meshed condition.

Naturally, the construction details and the embodiments may be varied widely from what is described and illustrated herein, without thereby departing from the scope of the present invention as defined in the claims that follow. Thus, for instance, the seats 11, 12 and the corresponding projections 21, 22 could be inverted, placing the former on the longitudinal elements 16 of the basket 3 and the latter on the uprights 6. Moreover, the projections 9, 18 of the comb-like formations 10 and 20 could have a more or less oblique conformation relative to the direction of coupling F, and they may also exhibit a slight curvature, and said direction of coupling F could also be different from the one indicated herein, i.e. not necessarily parallel to the uprights 6 and not even necessarily linear.

What is claimed is:

1. A supermarket trolley comprising a base made of moulded plastic material with wheels and two lateral uprights integral with the base and connected superiorly by a transverse bar and a basket container also made of moulded plastic material, connected at an end to said two lateral uprights, wherein said two lateral uprights of the base and said ends of the basket have respective mutually facing surfaces formed with substantially comb like formations mutually complementary and meshed following a relative coupling motion between said basket and said base along a direction of coupling when the trolley is assembled, and wherein said direction of coupling is substantially parallel to said uprights.

2. A trolley as claimed in claim 1, wherein said two lateral uprights and said end of the basket are formed with tongue and groove elements designed to engage each other as a result of the meshing between said comb like formations.

3. A trolley as claimed in claim 2, wherein said tongue and groove elements include, for each upright, a pair of respectively upper and lower seats designed to house a pair of corresponding upper and respectively lower projections of the basket.

4. A trolley as claimed in claim 1, wherein said comb like formations comprise a plurality of parallel projections generally elongated in said direction of coupling.

5. A trolley as claimed in claim 4, wherein said elongated projections are slightly inclined relative to said direction of coupling.

6. A trolley as claimed in claim 1, wherein said base and said basket are capable of being mutually locked relative to said direction of coupling by means of said transverse bar.

7. A trolley as claimed in claim 1, wherein said basket is open in correspondence with said end.

8. A trolley as claimed in claim 7, further including a child seat assembly applied in correspondence with said open end of the basket by means of said transverse bar.

9. A trolley as claimed in claim 1, wherein said base has a double "L" configuration whose vertical branches constitute said uprights and whose horizontal branches are interconnected by a front transverse member (5) and support a bearing plane.

10. A trolley as claimed in claim 1, wherein said end of the basket includes a pair of elongated elements with respective legs projecting underneath the basket.

11. A supermarket trolley comprising a base made of moulded plastic material with wheels and a support formed integral with the base and including two lateral uprights connected superiorly by a transverse bar and a basket container also made of moulded plastic material, connected at an end to said two lateral uprights, wherein said two lateral uprights of the base and said ends of the basket have respective mutually facing surfaces formed with substantially comb like formations mutually complementary and meshed following a relative coupling motion between said basket and said base along a direction of coupling when the trolley is assembled, wherein said direction of coupling is substantially parallel to said uprights.

12. A trolley as claimed in claim 11, wherein said two lateral uprights and said end of the basket are formed with tongue and groove elements designed to engage each other as a result of the meshing between said comb like formations.

13. A trolley as claimed in claim 11, wherein said tongue and groove elements include, for each upright, a pair of respectively upper and lower seats designed to house a pair of corresponding upper and respectively lower projections of the basket.

14. A trolley as claimed in claim 11, wherein said comb like formations comprise a plurality of parallel projections generally elongated in said direction of coupling.

15. A trolley as claimed in claim 11, wherein said elongated projections are slightly inclined relative to said direction of coupling.

16. A trolley as claimed in claim 11, wherein said base and said basket are capable of being mutually locked relative to said direction of coupling by means of said transverse bar.

17. A trolley as claimed in claim 11, wherein said basket is open in correspondence with said end.

18. A trolley as claimed in claim 11, further including a child seat assembly applied in correspondence with said open end of the basket by means of said transverse bar.

19. A trolley as claimed in claim 11, wherein said base has a double "L" configuration whose vertical branches constitute said uprights and whose horizontal branches are interconnected by a front transverse member (5) and support a bearing plane.

20. A trolley as claimed in claim 11, wherein said end of the basket includes a pair of elongated elements with respective legs projecting underneath the basket.

21. A supermarket trolley comprising a base made of moulded plastic material with wheels and two lateral uprights integral with the base and connected superiorly by a transverse bar and a basket container also made of moulded plastic material, connected at an end to said two lateral uprights, wherein said two lateral uprights of the base and said ends of the basket have respective mutually facing surfaces formed with substantially comb like formations mutually complementary and meshed following a relative coupling motion between said basket and said base along a direction of coupling when the trolley is assembled, and wherein said direction of coupling is substantially parallel to said uprights, wherein said two lateral uprights and said end of the basket are formed with tongue and groove elements designed to engage each other as a result of the meshing between said comb like formations, and wherein said tongue and groove elements include, for each upright, a pair of respectively upper and lower seats designed to house a pair of corresponding upper and respectively lower projections of the basket.

* * * * *